US012574520B2

(12) United States Patent
Ye et al.

(10) Patent No.: US 12,574,520 B2
(45) Date of Patent: Mar. 10, 2026

(54) MULTI-HYPOTHESIS CROSS COMPONENT PREDICTION MODELS

(71) Applicant: Tencent America LLC, Palo Alto, CA (US)

(72) Inventors: Jing Ye, Palo Alto, CA (US); Xin Zhao, Palo Alto, CA (US); Liang Zhao, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 33 days.

(21) Appl. No.: 18/622,837

(22) Filed: Mar. 29, 2024

(65) Prior Publication Data

US 2025/0150592 A1     May 8, 2025

Related U.S. Application Data

(60) Provisional application No. 63/604,095, filed on Nov. 29, 2023, provisional application No. 63/597,329, filed on Nov. 8, 2023.

(51) Int. Cl.
H04N 19/132      (2014.01)
H04N 19/105      (2014.01)
(Continued)

(52) U.S. Cl.
CPC ......... H04N 19/132 (2014.11); H04N 19/105 (2014.11); H04N 19/159 (2014.11); (Continued)

(58) Field of Classification Search
CPC .... H04N 19/105; H04N 19/11; H04N 19/132; H04N 19/159; H04N 19/176; H04N 19/186; H04N 19/593; H04N 19/70
See application file for complete search history.

(56) References Cited

U.S. PATENT DOCUMENTS

2014/0044179 A1*   2/2014   Li ........................... H04N 19/30
                                                    375/240.16
2021/0385439 A1*   12/2021   Zhu ........................ H04N 19/96
                        (Continued)

FOREIGN PATENT DOCUMENTS

WO      WO 2023116706 A1     6/2023
WO      WO-2025049984 A2 *   3/2025   ........... H04N 19/107

OTHER PUBLICATIONS

"Enhanced Cross-Component Linear Model for Chroma Intra-Prediction in Video Coding"—Zhang et al., IEEE Transactions On Image Processing, vol. 27, No. 8, Aug. 2018. (Year: 2018).*
(Continued)

*Primary Examiner* — Mainul Hasan
(74) *Attorney, Agent, or Firm* — Morgan, Lewis & Bockius LLP

(57)     ABSTRACT

The various implementations described herein include methods and systems for coding video. In one aspect, a video bitstream includes a current coding block of an image frame and signals a first syntax element for a multi-hypothesis cross-component prediction (MH-CCP) mode. A computing system determines that the MH-CCP mode is enabled to reconstruct each of a plurality of chroma samples of the current coding block using a respective luma sample and one or more neighboring luma samples. The computing device determines a number (N) of model parameters used in the MH-CCP mode for at least the current coding block, and identifies one or more neighboring luma samples of a first luma sample based on the number (N) of model parameters. A first chroma sample that is collocated with the first luma sample is determined based on the first luma sample and the one or more neighboring luma samples.

24 Claims, 9 Drawing Sheets

(51) Int. Cl.

| | | |
|---|---|---|
| *H04N 19/159* | (2014.01) | |
| *H04N 19/176* | (2014.01) | |
| *H04N 19/186* | (2014.01) | |
| *H04N 19/70* | (2014.01) | |

(52) U.S. Cl.
CPC ......... *H04N 19/176* (2014.11); *H04N 19/186* (2014.11); *H04N 19/70* (2014.11)

(56) References Cited

U.S. PATENT DOCUMENTS

| | | | |
|---|---|---|---|
| 2022/0210434 A1 | 6/2022 | Wang et al. | |
| 2024/0214575 A1* | 6/2024 | Yu ........................ | H04N 19/139 |
| 2025/0039437 A1* | 1/2025 | Jhu ...................... | H04N 19/154 |
| 2025/0063155 A1* | 2/2025 | Chiang ............... | H04N 19/105 |
| 2025/0071331 A1* | 2/2025 | Tsai ...................... | H04N 19/70 |

OTHER PUBLICATIONS

"Joint Cross-Component Linear Model For Chroma Intra Prediction"—Ghaznavi-Youvalari et al., 2020 IEEE 22nd International Workshop on Multimedia Signal Processing (MMSP); Sep. 21-24, 2020. (Year: 2020).*

Tencent America LLC, ISRWO, PCT/US2024/030402, Aug. 7, 2024, 8 pgs.

* cited by examiner $$predChromaVal = w_0L + w_PP + w_BB$$

$$predChromaVal = \sum w_iL_i + w_PP + w_BB$$

[0, 1, 2, 3]  [0, 1, 2, 3]  [0, 1]

$$predChromaVal = c_0C + c_1P + c_2B + c_3X$$

$$predChromaVal = c_0C + c_1P + c_2B + c_3Avg$$

402C $$predChromaVal = \sum w_iL_i + w_PP + w_BB$$

[0, 1, 2, 3, 4]   [0, 1, 2, 3, 4]   [0, 1]

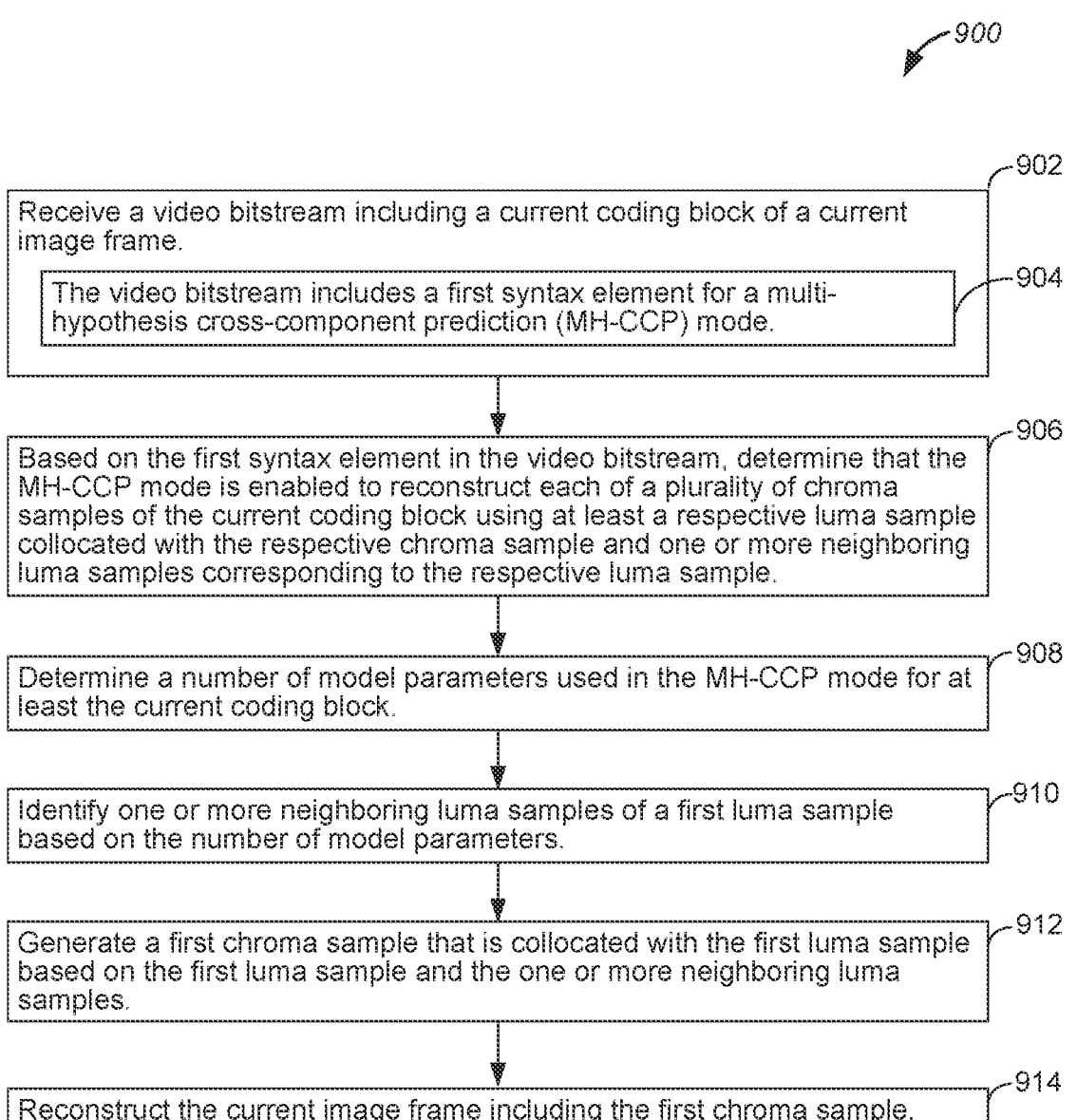

900

902

Receive a video bitstream including a current coding block of a current image frame.

904

The video bitstream includes a first syntax element for a multi-hypothesis cross-component prediction (MH-CCP) mode.

906

Based on the first syntax element in the video bitstream, determine that the MH-CCP mode is enabled to reconstruct each of a plurality of chroma samples of the current coding block using at least a respective luma sample collocated with the respective chroma sample and one or more neighboring luma samples corresponding to the respective luma sample.

908

Determine a number of model parameters used in the MH-CCP mode for at least the current coding block.

910

Identify one or more neighboring luma samples of a first luma sample based on the number of model parameters.

912

Generate a first chroma sample that is collocated with the first luma sample based on the first luma sample and the one or more neighboring luma samples.

914

Reconstruct the current image frame including the first chroma sample.

FIG. 9

MULTI-HYPOTHESIS CROSS COMPONENT PREDICTION MODELS

RELATED APPLICATIONS

This application claims priority to U.S. Provisional Patent Application No. 63/597,329, entitled "Multi-Hypothesis Cross Component Prediction Models," filed Nov. 8, 2023, and U.S. Provisional Patent Application No. 63/604,095, entitled "Multi-Hypothesis Cross Component Prediction Models," filed Nov. 29, 2023, each of which is hereby incorporated by reference in its entirety.

TECHNICAL FIELD

The disclosed embodiments relate generally to video coding, including but not limited to systems and methods for processing video data using multi-hypothesis cross-component prediction (MH-CCP).

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/ decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance:higher tolerable distortion generally allows for coding algorithms that yield higher losses and higher compression ratios.

The present disclosure describes video compression methods using intra prediction. A linear or nonlinear weighted sum of multiple versions of luma samples is used to predict a chroma sample, e.g., in multi-hypothesis cross-component prediction (MH-CCP). The multiple versions of luma samples includes a luma sample C that is co-located with the chroma sample and a filtered luma sample that is determined based on neighboring luma samples and applied as a filtering input. Each filtering input to a weighted sum is called a hypothesis. Each hypothesis is associated with a weighing factor in MH-CCP. In one aspect of the application, weighing factors are applied to generate the linear or nonlinear weighed sum of different versions of luma samples. These weighing factors are determined for each coding block based on a reference area of the respective coding block. In some embodiments, these weighing factors are determined by applying a least mean square calculation kernel to process reconstructed samples of reference blocks of each coding block.

Stated another way, in some embodiments, a sample of a second color component is predicted as a linear or nonlinear weighted sum a sample of a second color component, which is collocated with the sample of the second color component, and one or more associated neighboring luma sample(s) according to a multi-tap model associated with MH-CCP. The multi-tap model includes a number (N) of taps, which are selected from the collocated sample of the second color component, the one or more associated neighboring luma samples of the second color component, a nonlinear term, and an offset term. The multi-tap model corresponds to the same number (N) of selected terms combined to determine the sample of the second color component. In some embodiments, the sample of the first color component is one of a chroma sample and a luma sample, and the sample of the second color component is a luma sample. For example, the chroma sample is a weighted combination of terms selected from a respective collocated luma sample, one or more neighboring luma sample, the nonlinear term, and the offset term. Alternatively, in some embodiments, the first color component is one of the red, green, and blue colors, and the second color component is another one of the one of red, green, and blue colors. Alternatively, in some embodiments, the first color component and the second component correspond to a color format that is distinct from a YCbCr color format and an RGB color format.

In accordance with some embodiments, a method of video decoding is provided. The method includes receiving a video bitstream including a current coding block of a current image frame. The video bitstream includes a first syntax element for an MH-CCP mode. The method further includes, based on the first syntax element in the video bitstream, determining that the MH-CCP mode is enabled to reconstruct each of a plurality of chroma samples of the current coding block using at least a respective luma sample collocated with the respective chroma sample and one or more neighboring luma samples corresponding to the respective luma sample. The method further includes determining a number (N) of model parameters used in the MH-CCP mode for at least the current coding block, identifying one or more neighboring luma samples of a first luma sample based on the number (N) of model parameters, generating a first chroma sample that is collocated with the first luma sample based on the first luma sample and the one or more neighboring luma samples, and reconstructing the current coding block including the first chroma sample.

In accordance with some embodiments, a method of video encoding is provided. The method includes receiving video data comprising a current coding block of a current image frame, encoding the current image frame in accordance with intra prediction, determining that an MH-CCP mode is enabled to determine each chroma sample of the current coding block based on a respective luma sample collocated with the respective chroma sample and one or more neighboring luma samples corresponding to the respective luma sample, where the MH-CCP mode is associated with a number (N) of model parameters for identifying one or more neighboring luma samples of a first luma sample. The method further includes transmitting the encoded current image frame via a video bitstream and signaling, via the video bitstream, a first syntax element to indicate that the MH-CCP mode is applied to reconstruct a first chroma sample collocated with the first luma sample based on at least the first luma sample and the one or more neighboring luma samples.

In accordance with some embodiments, a method of bitstream conversion is provided. The method includes obtaining a source video sequence including a current coding block of a current image frame and performing a conversion between the source video sequence and a video bitstream. The video bitstream comprises the current coding block of the current image frame and a first syntax element for an MH-CCP mode indicating whether to reconstruct each chroma sample of the current coding block based on at least a respective luma sample collocated with the respective chroma sample and one or more neighboring luma samples corresponding to the respective luma sample. The MH-CCP mode is associated with a number (N) of model parameters for identifying one or more neighboring luma samples of a first luma sample, and applied to reconstruct a first chroma sample collocated with the first luma sample based on at least the first luma sample and the one or more neighboring luma samples.

In accordance with some embodiments, a method of video decoding is provided. The method includes receiving a video bitstream including a current coding block of a current image frame. The video bitstream includes a first syntax element for an MH-CCP mode. The method further includes, based on the first syntax element in the video bitstream, determining that the MH-CCP mode is enabled to reconstruct each sample of a second color component of the current coding block using at least a respective sample of a first color component collocated with the respective sample and one or more neighboring samples of the second color component corresponding to the respective sample of the first color component. The method further includes determining a number (N) of model parameters used in the MH-CCP mode for at least the current coding block, identifying one or more neighboring samples of a first sample of the first color component based on the number (N) of model parameters, generating a first sample of the second color component that is collocated with the first sample of the first color component based on the first sample and the one or more neighboring samples of the first color component, and reconstructing the current coding block including the first sample of the second color component.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 9 is a flow diagram illustrating a method of decoding video in accordance with some embodiments.

In accordance with common practice, the various features illustrated in the drawings are not necessarily drawn to scale, and like reference numerals can be used to denote like features throughout the specification and figures.

DETAILED DESCRIPTION

The present disclosure describes cross component intra prediction of video data in a MH-CCP mode where each of a plurality of samples of a first color component is determined based on one or more associated samples of a second color component. The MH-CCP mode corresponds to a multi-tap model that includes a number (N) of taps. Each tap is selected from a collocated sample of the second color component, the one or more associated neighboring luma samples of the second color component, a nonlinear term, and an offset term. The selected taps are combined in a weighted manner to determine the sample of the second color component. In some embodiments, the sample of the first color component is one of a chroma sample and a luma sample, and the sample of the second color component is a luma sample. For example, the chroma sample is a weighted combination of terms selected from a respective collocated luma sample, one or more neighboring luma sample, the nonlinear term, and the offset term. In some embodiments, the number of taps is selected from 2, 3, 4, and 5. In one aspect of this application, a computing device receives a video bitstream including a current coding block of a current image frame and a first syntax element for the MH-CCP mode and identifies a five tap model configured to determine chroma samples of the current coding block in the MH-CCP mode. Based on the five tap model, a pair of neighboring luma samples of a first luma sample is determined, and applied with a first luma sample, the nonlinear term, and the offset term to generate a first chroma sample that is collocated with the first luma sample.

Figure 1:
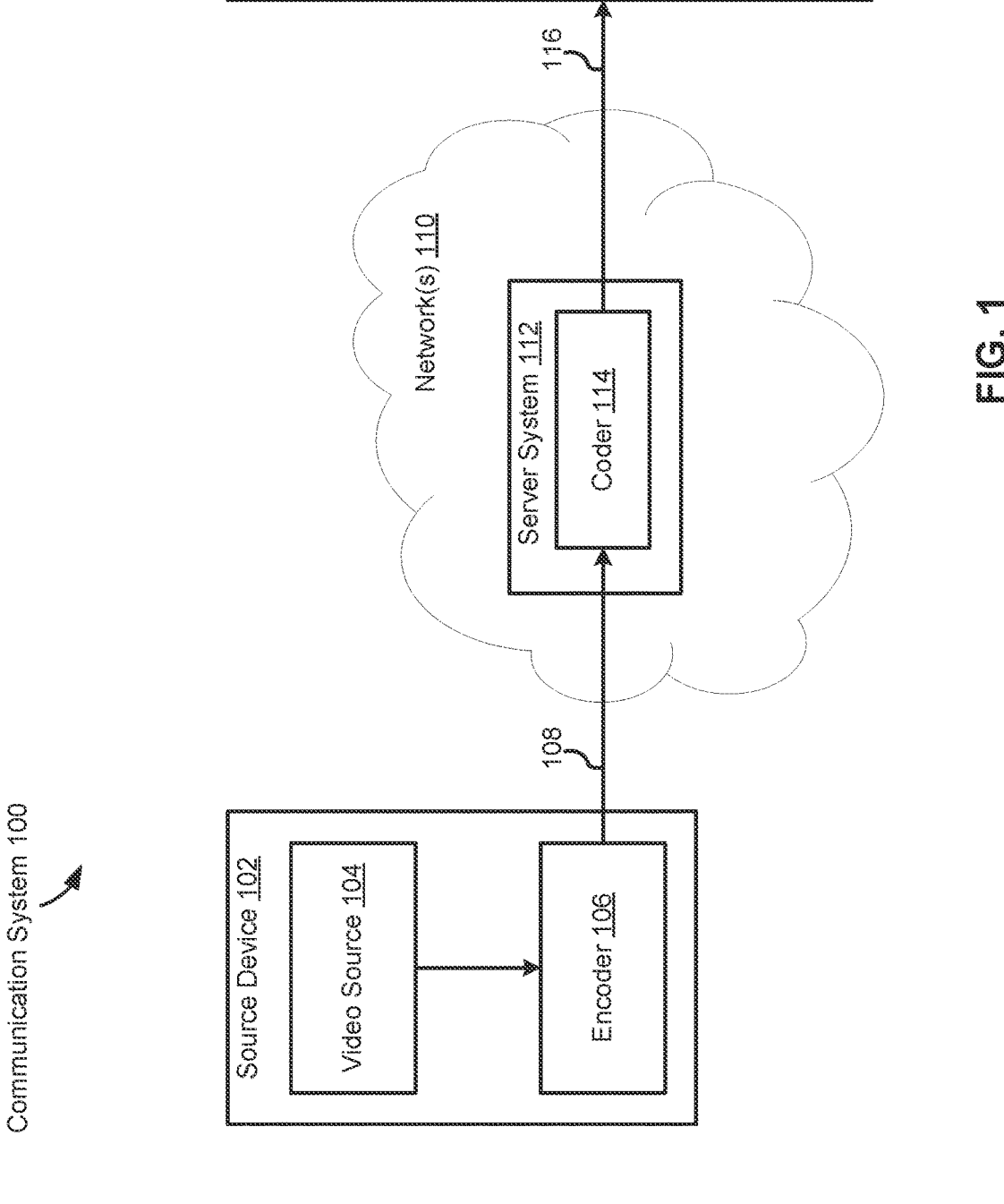
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
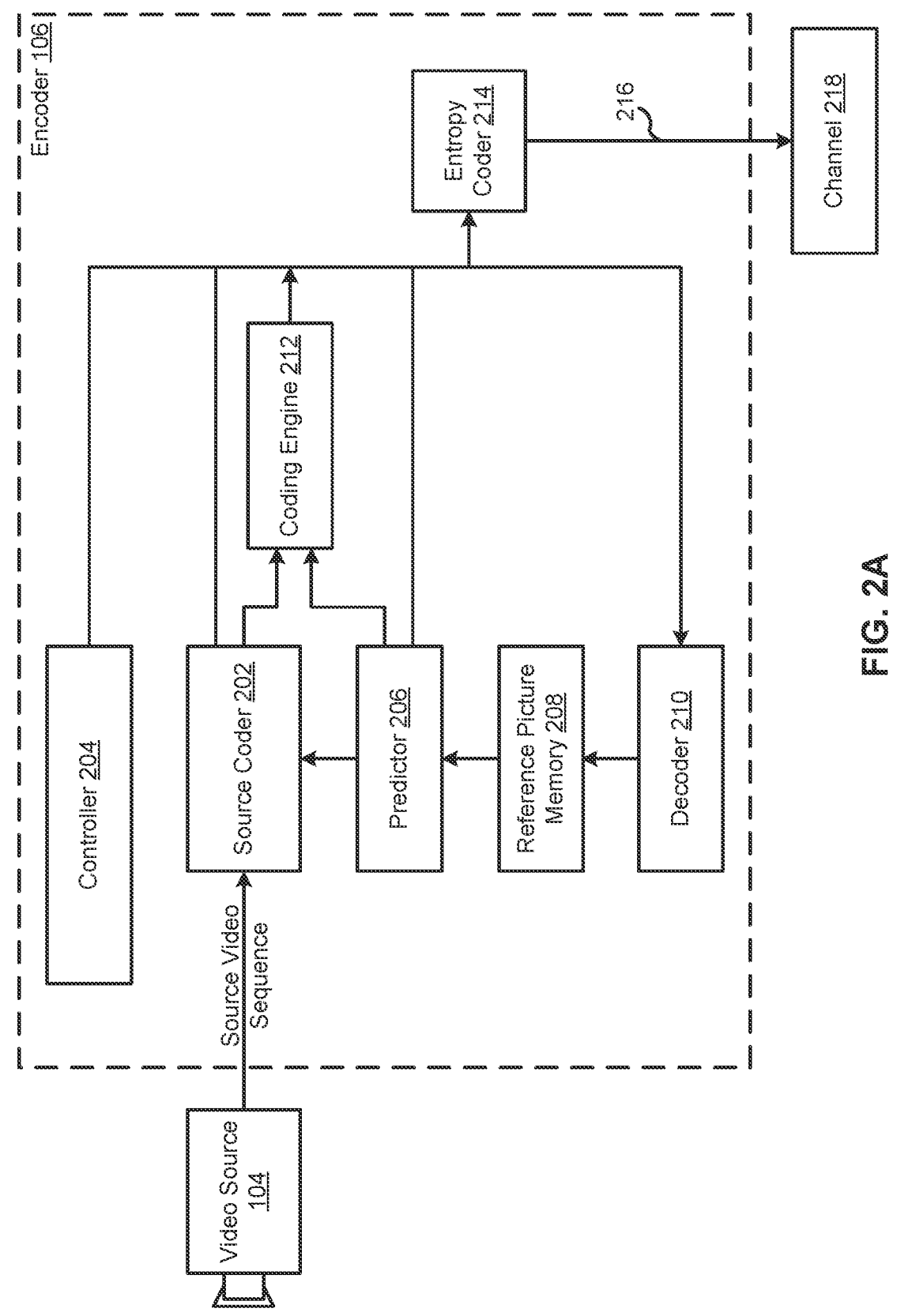
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
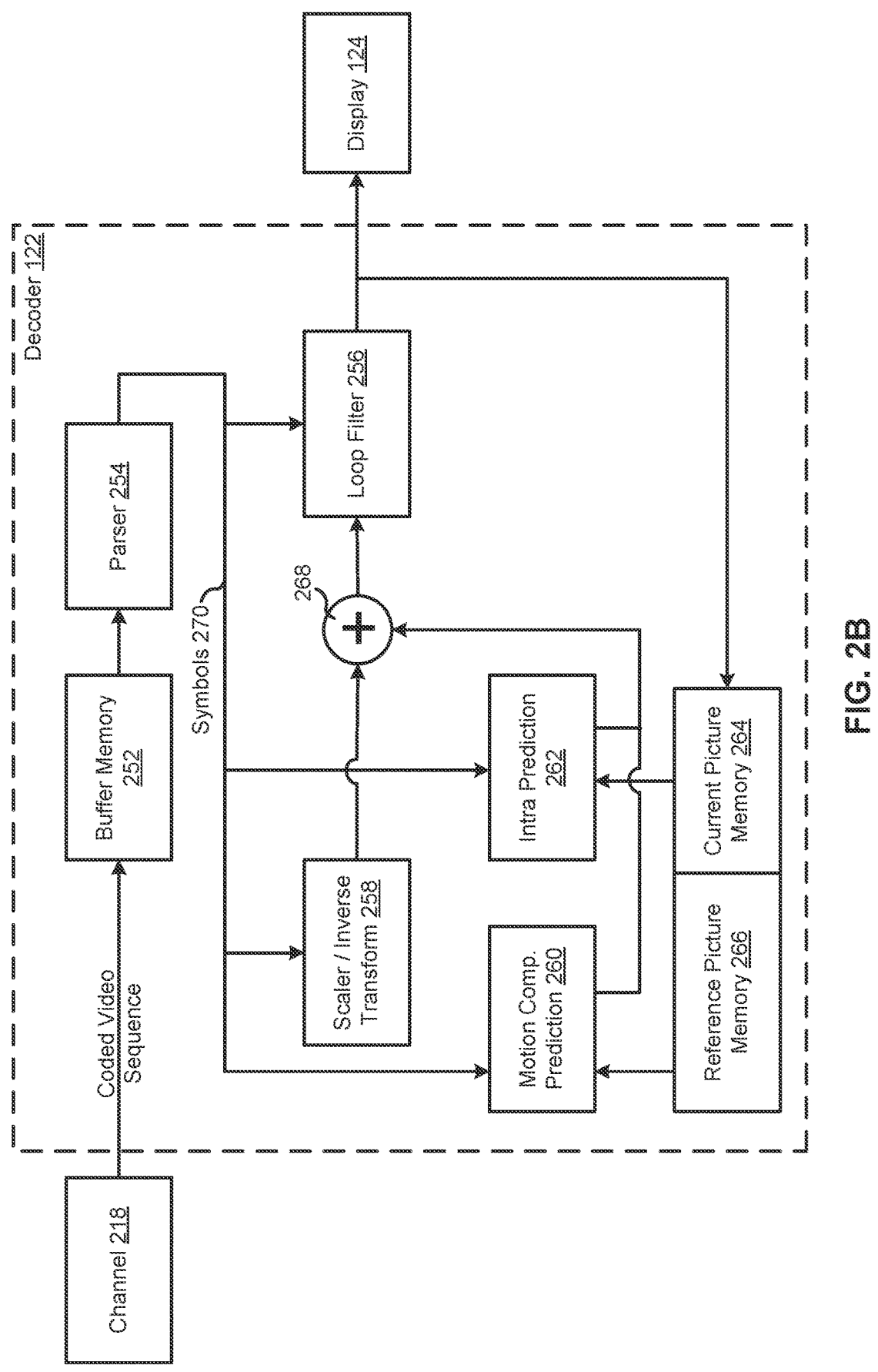
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
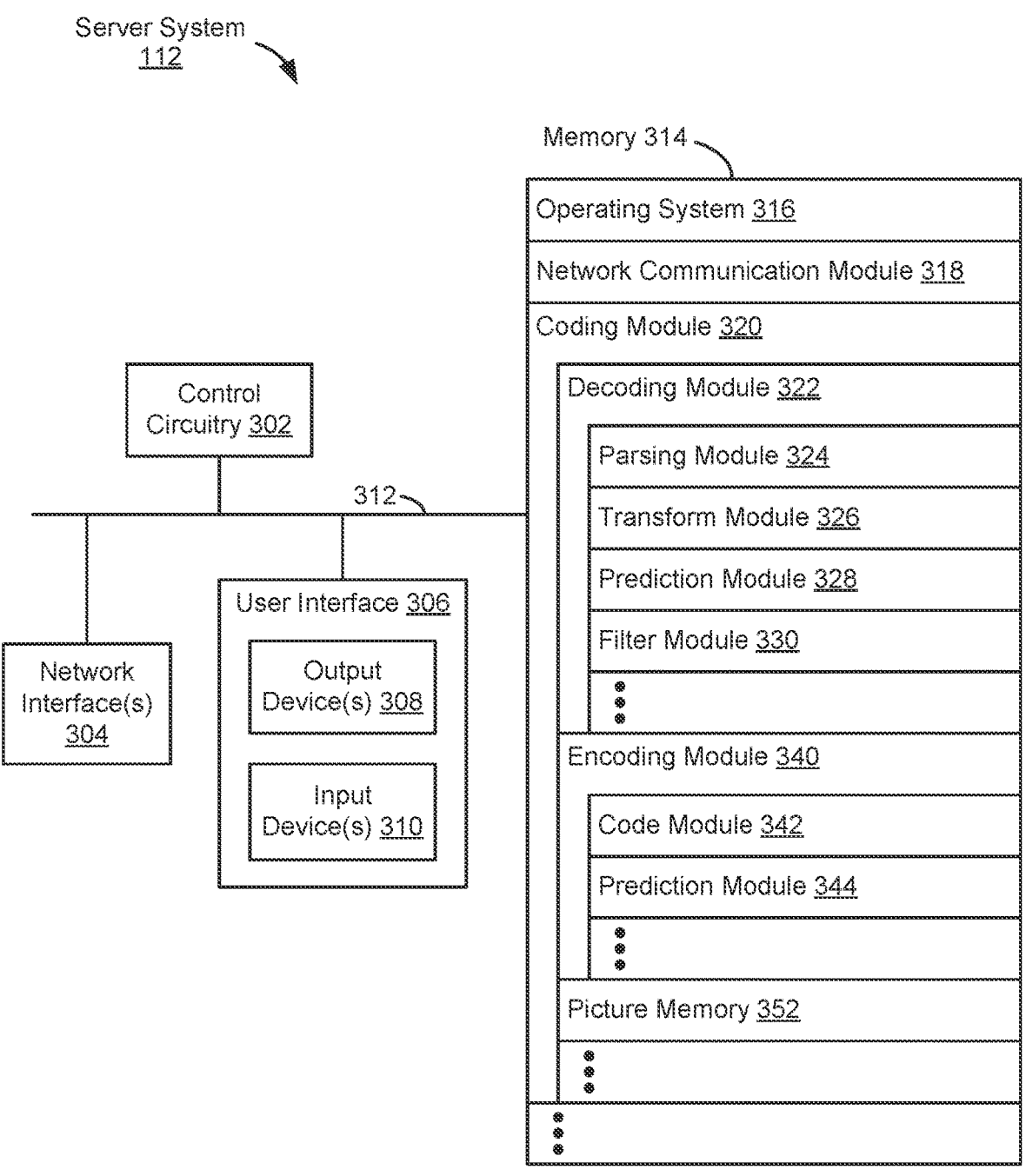
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks such as GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
- a decoding module 322 for performing various functions with respect to decoding encoded data, such as those described previously with respect to the decoder component 122; and
- an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
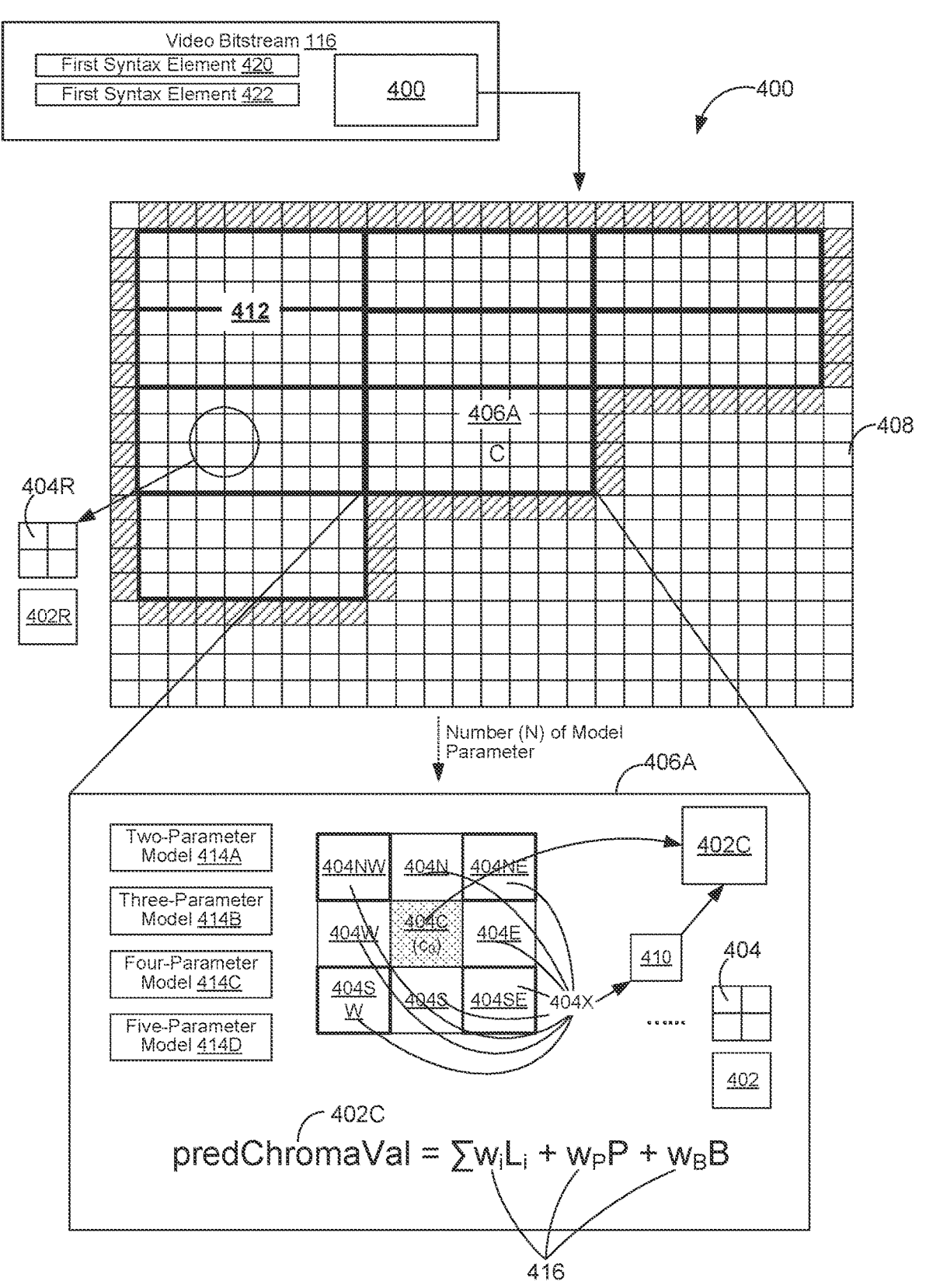
FIG. 4 illustrates an example scheme 400 for generating a first chroma sample from a plurality of luma samples in an MH-CCP mode, in accordance with some embodiments.

FIG. 4 illustrates an example scheme 400 for generating a first chroma sample 402C from a plurality of luma samples 404 (e.g., 404C and 404X) in an MH-CCP mode, in accordance with some embodiments. In some embodiments, a current coding block 406A of a current image frame 408 is coded in a cross-component intra prediction (CCIP) mode. In the CCIP mode, a decoder 122 (FIG. 2B) determines each of a plurality of chroma samples 402 of the current coding block 406A based on one or more luma samples 404 that have been reconstructed. In some situations, the CCIP mode includes a cross-component linear model mode (CCLM) in which a first chroma sample 402C is converted from a reconstructed luma sample 404C that is co-located with the chroma sample based on a linear model. Alternatively, in some situations, the CCIP mode includes a convolutional cross-component mode (CCCM) in which a first chroma sample 402C is predicted directly from a plurality of reconstructed luma samples 404X that is located adjacent to the first luma sample 404C based on a filter shape of a filter. Alternatively and additionally, in some situations, the CCIP mode includes the MH-CCP mode in which a first chroma sample 402C is generated by combining at least the first luma sample 404C that is co-located with the first chroma sample 402C and a plurality of hypothesis values 410 using a plurality of weighing factors 416. The plurality of neighboring luma samples 404X of the first luma sample 404C are combined using a plurality of coefficients to generate the plurality of hypothesis values 410.

In some embodiments, a video bitstream 116 includes a first syntax element 420 for the MH-CCP mode. The first chroma sample 402C of the current coding block 406A is configured to be generated by combining at least the first luma sample 404C that is co-located with the first chroma sample 402C and one or more neighboring luma samples 404X of the first luma sample 404C using a plurality of weighing factors 416 (e.g., $w_i$, $w_P$, $w_B$, where i is equal to 0 or a positive integer). In accordance with a determination that the MH-CCP mode is applied, the first chroma sample 402C is predicted based on the following equation:

$$predChromaVal = \sum w_i L_i + w_P P + w_B B \qquad (1)$$

where predChroma Val is a predicted chroma value of the first chroma sample 402C; $\sum w_i L_i$ represents a weighted sum of one or more luma values $L_i$ of one or more luma samples 404; i is equal to 0 to M; M is a number of linear terms of neighboring luma samples 404X; P is a nonlinear term; B is an offset term; and $w_P$ and $w_B$ are weighing factors associated with the nonlinear term and the offset term. In an example, the nonlinear term P is equal to $(L_0 \times L_0 + B) >> bit$ depth, where $L_0$ is a luma value of the first luma sample 404C and "bit depth" is a number of bits needed to represent the internal data values during encoding and decoding. In some embodiments, the nonlinear term P is determined based on a subset of the first luma sample 404C and the plurality of neighboring luma samples 404X. In some embodiments, B is a middle luma value of a luma value range (e.g., equal to 255 in a range of [0, 511]). Alternatively, in some embodiments, B is a median luma value or an average luma value of the luma samples 404 of the current coding block 406A.

In some embodiments, each of the one or more neighboring luma samples 404X of the first luma sample 404C is immediately adjacent to, and shares at least one respective side or vertex with, the first luma sample 404C. In some embodiments, the one or more neighboring luma samples 404X include a subset or all of a north neighboring luma sample (also called a top luma sample) 404N, a south neighboring luma sample (also called a bottom luma sample) 404S, a west neighboring luma sample (also called a left luma sample) 404W, an east neighboring luma sample (also called a right luma sample) 404E, a northwest neighboring luma sample (also called a top left luma sample) 404NW, a southeast neighboring luma sample (also called a bottom right luma sample) 404SE, a southwest neighboring luma sample (also called a bottom left luma sample) 404SW, and a northeast neighboring luma sample (also called a top right luma sample) 404NE. In some embodiments, the offset term B is generated based on an average of a subset of the one or more neighboring luma samples 404X of the first luma sample 404C, and the first chroma sample 402C is generated based on the offset term B.

In some embodiments, luma samples 404 and chroma samples 402 of the current coding block have different resolutions corresponding to a chroma subsampling scheme (e.g., 4:2:2 or 4:2:0). Each luma sample 404 includes a downsampled luma sample generated from reconstructed luma samples using a downsampling filter. Alternatively, in some embodiments, each luma sample 404 includes an original or reconstructed luma sample without any downsampling. That said, the first luma sample 404C is reconstructed according to a resolution of luma samples or downsampled to a resolution of chroma sample, so are neighboring luma samples 404X (e.g., 404N, 404W, 404E, 404S, 404NW, 404NE, 404SW, 404SE) either reconstructed according to a resolution of luma samples or downsampled to a resolution of chroma sample.

In some embodiments, a subset of terms of equation (1) is used to predict the first chroma sample 402C collocated with the first luma sample 404C. A number (N) of model parameters used in the MH-CCP mode is determined for at least the current coding block. One or more neighboring luma samples 404X of the first luma sample 404C are identified based on the number (N) of model parameters and applied to generate the first chroma sample 402C that is collocated with the first luma sample 404C. Additionally, in some embodiments, the number (N) of model parameters is selected from 2, 3, 4, and 5, and corresponding to a two-parameter model 414A, a three-parameter model 414B, a four-parameter model 414C, and a five-parameter model 414D to be applied to reconstruct the first chroma sample 402C of the current coding block 406A in the MH-CCP mode. More specifically, in some embodiments, the number (N) of model parameter is equal to 2, and two terms are selected in equation (1) to provide the two-parameter model 414A for determining the first chroma sample 402C. In some embodiments, the number (N) of model parameter is equal to 3, and three terms are selected in equation (1) to provide the three-parameter model 414B for determining the first chroma sample 402C. In some embodiments, the number (N) of model parameter is equal to 4, and four terms are selected in equation (1) to provide the four-parameter model 414C for determining the first chroma sample 402C. In some embodiments, the number (N) of model parameter is equal to 5, and five terms are selected in equation (1) to provide the five-parameter model 414D for determining the first chroma sample 402C. Alternatively, in some embodiments, the number (N) of model parameter is equal to 6 or above, and six or more terms are selected in equation (1) to provide an associated model for determining the first chroma sample 402C.

In an example, the number (N) is equal to 3, and equation (1) includes at least a single linear term of the first luma sample 404C that is co-located with the first chroma sample 402C. $L_0$ is a luma value of the first luma sample 404C, and $w_0$ is an associated weighing factor. In another example, the number (N) is equal to 4 or above, and equation (1) includes the single linear term of the first luma sample 404C and a number (e.g., M) of linear terms of neighboring luma samples 404X of the first luma sample 404C. $L_0$-$L_M$ represent luma values of the luma samples 404, and $w_0$-$w_M$ are associated weighing factors, where M is a positive integer and equal to N−3.

In some embodiments, the video bitstream 116 further includes a second syntax element 422 indicating the number (N) of model parameters used in the MH-CCP mode for at least the current coding block 406A. Further, in some embodiments, the second syntax element 422 is signaled at one of a sequence header, a picture header, a subpicture header, a slice header, and a tile header. In some embodiments, the second syntax element 422 is signaled as a block-level syntax element on one of a largest coding block level, a coding block level, a prediction block level, a transform block level, and a predefined fixed block size level.

Conversely, in some embodiments, the video bitstream 116 does not include the second syntax element 422 for indicating the number (N) of model parameters used in the MH-CCP mode for the current coding block 406A. The number (N) of model parameters is determined based on coded information that is shared between an encoder 106 and a decoder 122. The coded information includes one or more of a frame resolution of the current image frame 408, a quantization parameter, a block size, a block shape, and a luma prediction mode of the current coding block 406A.

In some embodiments, the number (N) of model parameters used in the MH-CCP mode is selected from a plurality of predefined values (e.g., 2, 3, 4, 5). One of the first luma sample 404C and the one or more neighboring luma samples 404X is selected based on the number (N) of model parameters. At least two of the plurality of predefined values correspond to two distinct selected luma samples. The non-linear term P is determined based on the selected one of the first luma sample 404C and the one or more neighboring luma samples 404X. The first chroma sample 402C is further generated based on the non-linear term P. Stated another way, the non-linear term P may be determined based on one or more luma values $L_0$-$L_M$ of the luma samples 404, where M is a number of neighboring luma samples 404X used to determine the first chroma sample 402C.

In some embodiments, in accordance with a determination that the number (N) of model parameters is equal to a first value (e.g., 3), a first non-linear term P is generated based on a first one of the first luma sample 404C and the one or more neighboring luma samples 404X (e.g., the first luma sample 404C). In accordance with a determination that the number (N) of model parameters (N) is equal to a second value (e.g., 4) distinct from the first value (e.g., 3), a second non-linear term P is generated based on a second distinct one of the first luma sample 404C and the one or more neighboring luma samples 404X (e.g., an average of the neighboring luma samples 404W and 404E).

In some embodiments, the number (N) of model parameters corresponds to a plurality of hypothesis tap combinations. The one or more neighboring luma samples 404X of the first luma sample 404C are identified by selecting one of the plurality of hypothesis tap combinations corresponding to the number (N) of model parameters and identifying the one or more neighboring luma samples 404X of the first luma sample 404C based on the one of the plurality of hypothesis tap combinations. For example, the number (N) of model parameters is equal to 5, and corresponds to one of a horizontal tap hypothesis tap combination and a vertical hypothesis tap combination. In accordance with the horizontal tap hypothesis tap combination, the first chroma sample 402C is predicted based on the following five parameter model:

$$predChromaVal = w_0C + w_1W + w_2E + w_PP + w_BB \qquad (2)$$

where C, W, and E are luma values of the first luma value 404C, the left neighboring luma sample 404W, and the right neighboring luma sample 404E, respectively. Alternatively, in accordance with the vertical tap hypothesis tap combination, the first chroma sample 402C is predicted based on the following five parameter model:

$$predChromaVal = w_0C + w_1N + w_2S + w_PP + w_BB \qquad (3)$$

where N and S are luma values of the top neighboring luma sample 404N and the bottom neighboring luma sample 404S.

In some embodiments, the plurality of weighing factors 416 (e.g., $w_i$, $w_P$, $w_B$) are determined based on a set of one or more reference luma samples 404R and a set of one or more co-located reference chroma samples 402R within a reference area 412 of the current coding block 406A. The reference area 412 is located in the current image frame 408. Further, in some embodiments, the reference luma samples 404R of the reference area 412 are used to generate one or more chroma samples 402C based on equation (1). In some embodiments, the set of one or more co-located reference chroma samples 402R and the one or more re-generated chroma samples are compared to generate a least mean square (LMS) value. The plurality of weighing factors 416 (e.g., $w_i$, $w_P$, $w_B$) are iteratively adjusted to reduce the LMS value, until the LMS value satisfies a predefined criterion (e.g., in which the LMS value is below a threshold LMS value or is minimized).

In some embodiments, at least one weighing factor 416 is derived based on chroma samples and luma samples within the reference area 412 of the current coding block 406A, and the reference area 412 includes one or more coding blocks (e.g., 8 coding blocks in FIG. 4) that are decoded prior to, the current coding block 406A. In some embodiments, a subset of the one or more coding blocks is immediately adjacent to the current coding block 406A. In some embodiments, a subset of the one or more coding blocks are separated from the current coding block 406A by one or more coding blocks. In some embodiments, the reference area 412 includes at least a portion of one or more rows above the current coding block 406A and/or a portion of one or more columns to the left of the current coding block 406A. For example, referring to FIG. 4, the reference area

412 includes 7 rows of luma samples 404 above the current coding block 406A and nine columns of luma samples 404 to the left of the current coding block 406A.

In some embodiments, the at least one weighing factor 416 is determined by minimising a mean square error (MSE) between predicted and reconstructed chroma samples 402 in the reference area 412. The MSE minimization is performed by calculating autocorrelation matrix for the luma samples 404 and a cross-correlation vector between the luma samples 404R and chroma samples 402R of the reference area 412. Autocorrelation matrix is processed with LDL decomposition and the plurality of weighing factors 416 is calculated using back-substitution. The process follows roughly the calculation of filter coefficients of an adaptive loop filter (ALF) in enhanced compression model (ECM) video coding. LDL decomposition does not use square root operations and uses only integer arithmetic operations.

Figure 5:
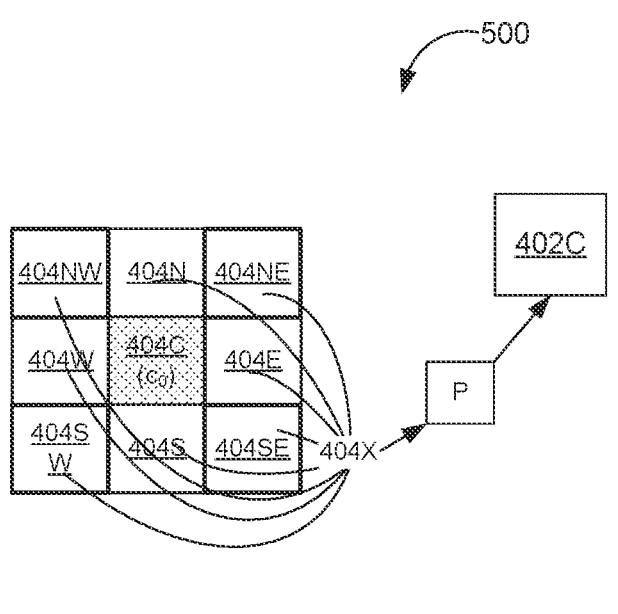
FIG. 5 illustrates an example scheme for generating a first chroma sample in an MH-CCP mode corresponding to a two-parameter model having two model parameters, in accordance with some embodiments.

FIG. 5 illustrates an example scheme 500 for generating a first chroma sample 402C in an MH-CCP mode corresponding to a two-parameter model 414A having two model parameters, in accordance with some embodiments. The number (N) of model parameters is equal to 2 and corresponds to a two-parameter model 414A applied to reconstruct the first chroma sample 402C of the current coding block 406A in the MH-CCP mode, and the first chroma sample 402C is generated based on a weighted combination of a non-linear term P and an offset term B. Stated another way, the first chroma sample 402C is predicted based on the following two parameter model:

$$predChromaVal = w_P P + w_B B. \qquad (4)$$

Further, in some embodiments, the non-linear term P is determined based on at least one of a set of eight neighboring luma sample 404X of the first luma sample 404C.

Figure 6:
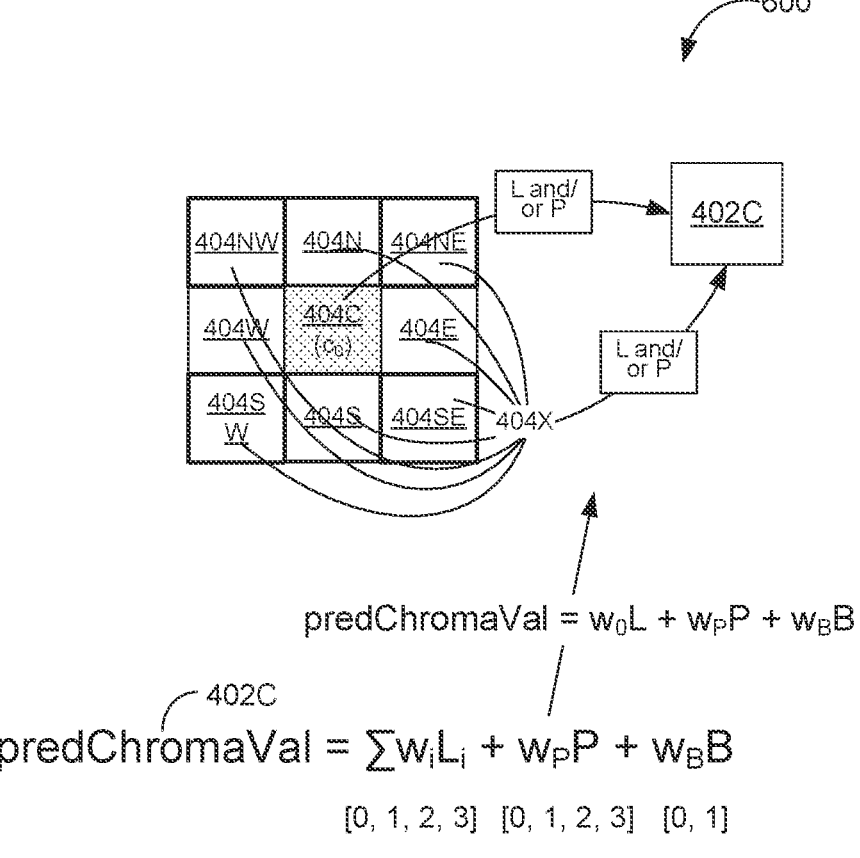
FIG. 6 illustrates an example scheme for generating a first chroma sample in an MH-CCP mode corresponding to a three-parameter model having three model parameters, in accordance with some embodiments.

FIG. 6 illustrates an example scheme 600 for generating a first chroma sample 402C in an MH-CCP mode corresponding to a three-parameter model 414B having three model parameters, in accordance with some embodiments. The number (N) of model parameters is equal to 3 and corresponds to a three-parameter model 414B applied to reconstruct the first chroma sample 402C of the current coding block 406A in the MH-CCP mode. The first chroma sample is generated based on a weighted combination of a first number K1 of linear terms (e.g., $w_i L_i$ in equation (1)), a second number K2 of non-linear terms (e.g., $w_P P$ in equation (1)), and a third number K3 of offset terms (e.g., $w_B B$ in equation (1)). A sum of the first number K1, the second number K2, and the third number K3 is equal to 3, and the first number, the second number, and the third number are integer numbers selected from ranges of [0, 3], [0, 3], and [0,1], respectively. For example, the first chroma sample 402C is predicted based on any of the following four parameter models:

$$predChromaVal = w_0 C + w_1 W + w_B B \qquad (5.1)$$

$$predChromaVal = w_0 C + w_{P1} P_1 + w_{P2} P_2 \qquad (5.2)$$

$$predChromaVal = w_0 C + w_P P + w_B B \qquad (5.3)$$

$$predChromaVal = w_{P1} P_1 + w_{P2} P_2 + w_B B \qquad (5.4)$$

$$predChromaVal = w_0 W + w_P P + w_B B \qquad (5.5)$$

In some embodiments, the number (N) of model parameters is equal to 3 and corresponds to a three-parameter model 414B applied to reconstruct the first chroma sample

402C of the current coding block 406A based on a weight sum of the first luma sample 404C, a non-linear term $w_P P$, and an offset term $w_B B$ in the MH-CCP mode. The non-linear term $w_P P$ is determined based on at least one of the first luma sample 404C and eight neighboring luma samples 404X (e.g., 404W, 404N, 404E, 404S, 404NW, 404NE, 404SW, 404SE) of the first luma sample 404C.

Alternatively, in some embodiments, the number (N) of model parameters is equal to 3 and corresponds to a three-parameter model 414B applied to reconstruct the first chroma sample 402C of the current coding block 406A based on a first neighboring luma sample, a non-linear term $w_P P$, and an offset term $w_B B$ in the MH-CCP mode. For example, the first neighboring luma sample is one of the eight neighboring luma samples 404X (e.g., 404W, 404N, 404E, 404S, 404NW, 404NE, 404SW, 404SE) of the first luma sample 404C. The non-linear term $w_P P$ is determined based on at least one of the first luma sample 404C, the first neighboring luma sample, and a set of seven remaining neighboring luma samples of the first luma sample. Stated another way, the non-linear term $w_P P$ is determined based on at least one of the first luma sample 404C and eight neighboring luma samples 404X (e.g., 404W, 404N, 404E, 404S, 404NW, 404NE, 404SW, 404SE) of the first luma sample 404C.

Figure 7:
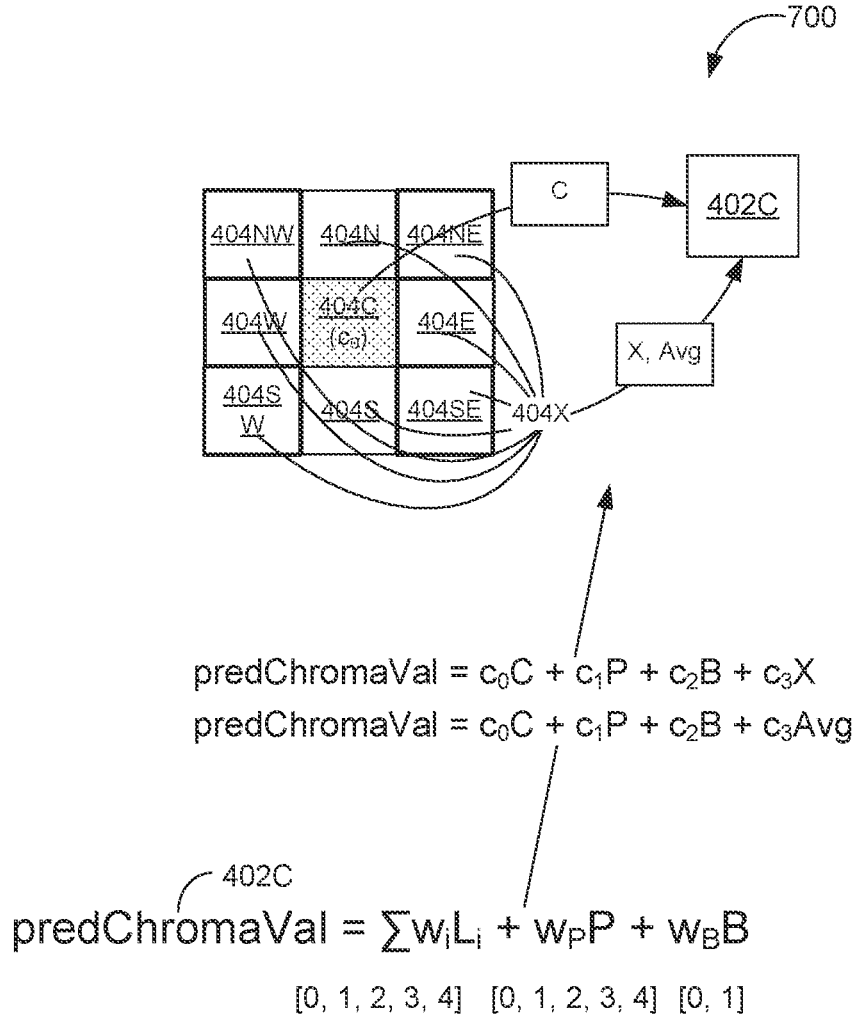
FIG. 7 illustrates an example scheme for generating a first chroma sample in an MH-CCP mode corresponding to a four-parameter model having four model parameters, in accordance with some embodiments.

FIG. 7 illustrates an example scheme 700 for generating a first chroma sample 402C in an MH-CCP mode corresponding to a four-parameter model 414C having four model parameters, in accordance with some embodiments. The number (N) of model parameters is equal to 4 and corresponds to a four-parameter model 414C applied to reconstruct the first chroma sample 402C of the current coding block 406A in the MH-CCP mode. The first chroma sample 402C is generated based on a weighted combination of a first number K1 of linear terms, a second number K2 of non-linear terms, and a third number K3 of offset terms, wherein a sum of the first number K1, the second number K2, and the third number K3 is equal to 3, and the first number K1, the second number K2, and the third number K3 are integer numbers selected from ranges of [0, 4], [0, 4], and [0,1], respectively. For example, the first chroma sample 402C is predicted based on any of the following four parameter models:

$$predChromaVal = w_0 C + w_1 W + w_P P + w_B B \qquad (6.1)$$

$$predChromaVal = w_0 C + w_1 E + w_{P1} P_1 + w_{P2} P_2 \qquad (6.2)$$

$$predChromaVal = w_0 C + w_{P1} P_1 + w_{P2} P_2 + w_B B \qquad (6.3)$$

$$predChromaVal = w_{P1} P_1 + w_{P2} P_2 + w_{P3} P_3 + w_{P4} P_4 \qquad (6.4)$$

In some embodiments (e.g., associated with equation (6.1)), the number (N) of model parameters is equal to 4 and corresponds to a four-parameter model 414C applied to reconstruct the first chroma sample 402C of the current coding block 406A based on a weight sum of the first luma sample 404C, one of the one or more neighboring luma samples (e.g., a left neighboring luma sample 404W), a non-linear term, and an offset term in the MH-CCP mode.

Figure 8:
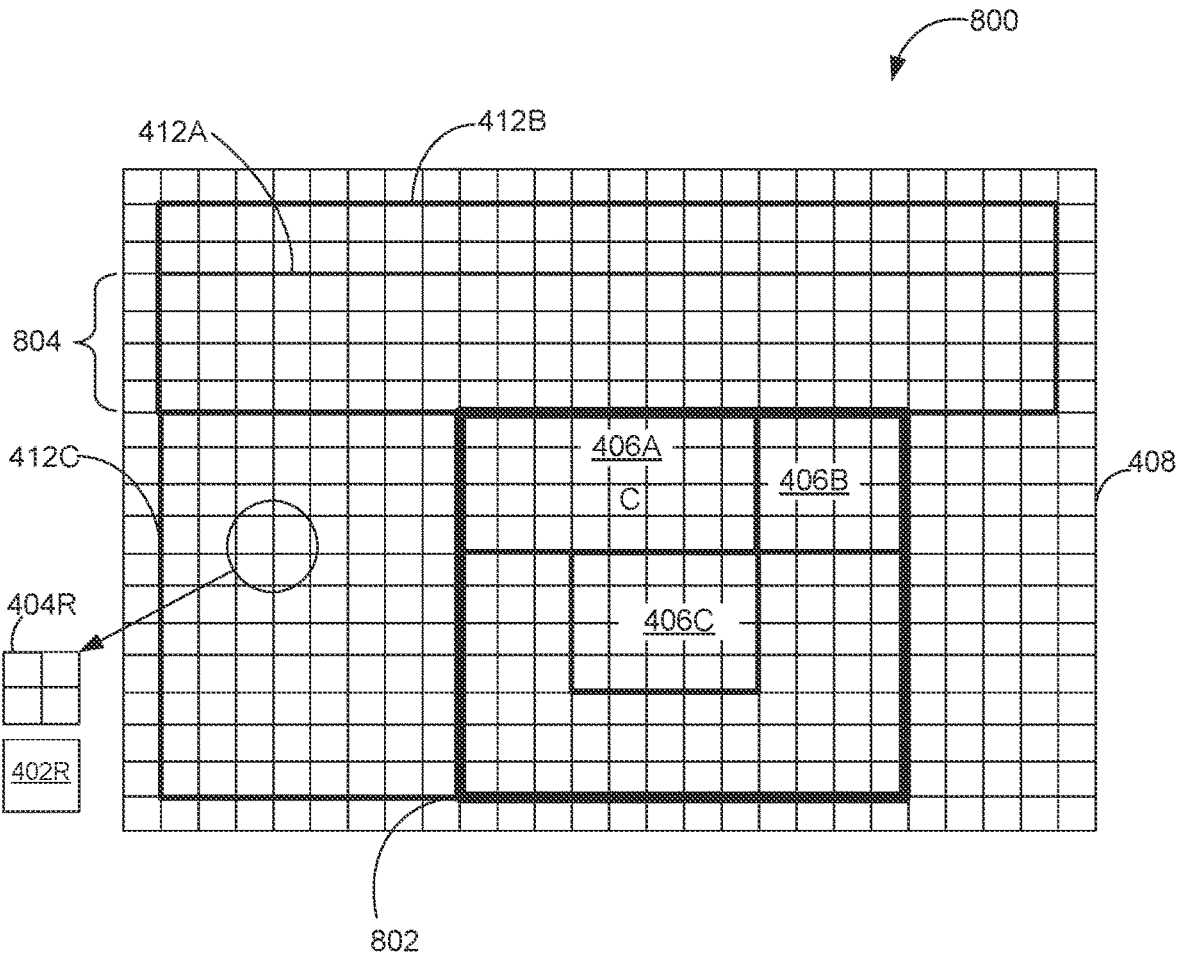
FIG. 8 illustrates an example location of a current coding block with reference to a current superblock, in accordance with some embodiments.

FIG. 8 illustrates an example location 800 of a current coding block 406A with reference to a current superblock 802, in accordance with some embodiments. The current coding block 406A is included in the current superblock 802, which is the largest coding block of the current image frame 408. In accordance with a determination that the current coding block 406A is located immediately adjacent to a top boundary of the current superblock 802, a first top reference area 412A having a first number of rows (e.g., 6 rows) and located immediately above the current coding block is applied to determine a plurality of weighing factors for generating the first chroma sample 402C. In accordance with a determination that the current coding block 406A is not located immediately adjacent to the top boundary of the current superblock 802, a second top reference area 412B having a second number of rows (e.g., 4 rows) and located immediately above the current coding block 406A is applied to determine the plurality of weighing factors for generating the first chroma sample 402C. The first number is greater than the second number. Stated another way, more rows of luma samples 404R are used to determine the plurality of weighing coefficients when the current coding block 406A is located immediately adjacent to the top boundary of current superblock 802.

In some embodiments, the first luma sample 404C and the one or more neighboring luma samples 404X have a resolution distinct from that of the first chroma sample 402C.

In some embodiments, the current superblock 802 further includes an alternative coding block 406B distinct from the current coding block 406A. In accordance with a determination that the alternative coding block is located immediately adjacent to the top boundary of the current superblock 802, the MH-CCP mode is aborted for the alternative coding block 406B.

In some embodiments, a reference area 412 of the current coding block includes a top reference region 412A having a first number of rows (e.g., 4 rows) and a left reference region 412C having a second number of columns (e.g., 8 columns). The first number is less than the second number. The plurality of weighing factors are determined based on a set of one or more reference samples 404R and/or 402R in the reference area 412 for generating the first chroma sample 402C.

In some embodiments, a reference area 412 includes a subset of a plurality of rows of samples 804 that are immediately above the current coding block. The plurality of rows of samples 804 include a number of rows, and the number of rows is selected from a predefined set of integer numbers (e.g., 1, 2, 3, 4, 5, 6).

FIG. 9 is a flow diagram illustrating a method 900 of decoding video in accordance with some embodiments. The method 900 may be performed at a computing system (e.g., the server system 112, the source device 102, or the electronic device 120) having control circuitry and memory storing instructions for execution by the control circuitry. In some embodiments, the method 900 is performed by executing instructions stored in the memory (e.g., the memory 314) of the computing system. In some embodiments, the method 900 is applied jointly with one or more video codecs, including but not limited to, H.264, H.265/HEVC, H.266/VVC, AV1 and AVS/AVS2/AVS3. In some embodiments, a linear or nonlinear weighted sum of multiple versions of co-located luma samples 404C (FIG. 4) are used to predict the chroma values 402C in an MH-CCP mode. The multiple versions of co-located luma samples 404C are derived from either the co-located luma sample 404C, or the filtered co-located luma sample using neighboring luma samples 404X (e.g., 404W, 404N, 404E, 404S, 404NW, 404NE, 404SW, 404SE) as filtering inputs. Each input (e.g., corresponding a respective version of co-located luma samples) to the weighted sum is called a hypothesis. In some situations, a value of each hypothesis is fed into the least mean square calculation kernel to derive weights of the respective hypothesis used in MH-CCP. In some embodiments, a first luma sample 404C has eight neighboring luma samples 404X (FIG. 5) that are immediately adjacent to the first luma sample 404C. Further, in some embodiments, each luma sample 404 (e.g., 404C, 404X) includes a downsampled luma sample generated using a downsampling filter, when luma and chroma have different dimensions, e.g., 4:2:2 or 4:2:0. Alternatively, each luma sample 404 includes an original co-located luma sample without any downsampling.

In one aspect of this application, an adaptive MH-CCP mode is applied to supports switching of different numbers (N) of model parameters. In an example, a two-parameter model 414A, a three-parameter model 414B, a four-parameter model 414C, or a five-parameter model 414D (FIG. 4) is applied adaptively. In some embodiments, selection of the number of model parameters is explicitly signaled in the video bitstream 116. In an example, the number (N) of model parameters is signaled at a high-level syntax, including but not limited to sequence header, picture header, subpicture header, slice header, tile header. In another example, the number (N) of model parameters is explicitly signaled at block-level, including but not limited to largest coding block level, coding block level, prediction block level, transform block level, a predefined fixed block size level. In yet another example, the number (N) of model parameters is signaled at both the high-level syntax and the block level, and the number (N) of model parameters signaled at the block level trumps the number of model parameters signaled at the high syntax level for a current coding block 406A.

Conversely, in some embodiments, the number (N) of model parameters is implicitly derived. For example, the number (N) of model parameters is implicitly derived based on the coded information known to both encoder and decoder, including but not limited to the frame resolution, quantization parameter, block size, block shape, luma prediction mode.

In some embodiments, for different options of the number (N) of model parameters, different non-linear terms P are applied. In some embodiments, different options for the same number (N) of model parameters correspond to different input positions (e.g., different neighboring luma samples 404X.

In some embodiments, a two-parameter model 414A is applied in an MH-CCP mode, and the first chroma sample 402C is determined based on a weighted sum of a non-linear term P and an offset term B, e.g., according to equation (4). In other words, a two-tap model corresponds to the two-parameter model 414A and includes the non-linear term P and the offset term B. In some embodiments, the nonlinear term B in the two-parameter model 414A is determined based on one of the eight neighboring luma samples 404X (e.g., 404N, 404W, 404E, 404S, 404NW, 404NE, 404SW, 404SE).

In some embodiments, a three-parameter model 414B is applied in an MH-CCP mode with a variable number (e.g., 0, 1, 2, 3) of linear terms, a variable number (e.g., 0, 1, 2, 3) of non-linear terms P, and a variable number (e.g., 0, 1) of offset terms B. In some embodiments, the three-parameter model 414B includes the first luma sample 404C, the non-linear term P, and the offset term B. The first chroma sample 402C is determined by equation (5.3). In some embodiments, the three-parameter model 414B includes one the eight neighboring luma values 404X (e.g., having a luma value X), the nonlinear term P, and the offset term B. In some embodiments, the nonlinear term P is determined based on the luma value X. For example, the nonlinear term P is equal to $(XX+B)>>$bit depth. In some embodiments, the nonlinear term P is determined based on the first luma sample 404C. In some embodiments, the linear terms correspond to one or more neighboring luma samples 404X of the first luma sample 404C, e.g., in equation (5.5).

In some embodiments, a four-parameter model 414C is applied in an MH-CCP mode with a variable number (e.g., 0, 1, 2, 3, 4) of linear terms, a variable number (e.g., 0, 1, 2, 3, 4) of non-linear terms P, and a variable number (e.g., 0, 1) of offset terms B. In some embodiments, the four-parameter model 414 includes a first linear term of at least one of eight neighboring luma samples 404X, which has a luma value X, a second linear term of the first luma sample 404C collocated with the first chroma sample 402C, a nonlinear term P, and an offset term B. In an example, a left neighboring luma sample 404W is applied to provide the first linear term, e.g., according to equation (6.1). In some embodiments, the four-parameter model 414C is applied in the MH-CCP mode, and the first linear term or the offset term B is equal to an average Avg of a subset of neighboring luma samples 404X of the first luma sample 404C. The first chroma sample 402C (predChromaVal) is predicted as follows:

$$predChromaVal = w_0C + w_1Avg + w_PP + w_BB \qquad (7.1)$$

$$predChromaVal = w_0C + w_1X + w_PP + w_BAvg \qquad (7.2)$$

In another aspect, an MH-CCP mode is applied to a current coding block 406A located at a top boundary of the largest coding block (e.g., a current superblock 802 in FIG. 8) of the current image frame 408. A top reference area 412A corresponding to the current coding block 406A has a smaller number of rows than a top reference area 412B corresponding to a distinct coding block 406C that is not located at the top boundary of the current superblock 802. In other ways, the current coding block 406A located at the top boundary of the current superblock 802 uses a smaller line buffer space. In some embodiments, the luma sample 404 of the current coding block 406A is not downsampled. In another embodiment, a number of columns in a left reference region 412C is distinct from a number of rows in the top reference area 412A or 412B. The number of columns are greater than the number of rows. In some embodiments, the number of rows in the top reference area 412A is smaller than a threshold number (e.g., 4, 5), and less than the threshold number of rows of samples in the top reference area 412A are applied to determine the plurality of weighing factors.

In yet another aspect, the MH-CCP mode is disabled automatically for an alternative coding block 406B that is located at the top boundary of the current superblock 802.

Although FIG. 7 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 900 is implemented for decoding video data. The method 900 includes receiving (operation 902) a video bitstream including a current coding block of a current image frame, wherein the video bitstream includes (operation 904) a first syntax element for a multi-hypothesis cross-component prediction (MH-CCP) mode; based on the first syntax element in the video bitstream, determining (operation 906) that the MH-CCP mode is enabled to reconstruct each of a plurality of chroma samples of the current coding block using at least a respective luma sample collocated with the respective chroma sample and one or more neighboring luma samples corresponding to the respective luma sample; determining (operation 908) a number of model parameters used in the MH-CCP mode for at least the current coding block; identifying (operation 910) one or more neighboring luma samples of a first luma sample based on the number of model parameters; generating (operation 912) a first chroma sample that is collocated with the first luma sample based on the first luma sample and the one or more neighboring luma samples; and reconstructing (operation 914) the current coding block including the first chroma sample.

(A2) In some implementations of A1, the number of model parameters is selected from 2, 3, 4, and 5, and corresponds to a two-parameter model, a three-parameter model, a four-parameter model, and a five-parameter model to be applied to reconstruct the first chroma sample of the current coding block in the MH-CCP mode.

(A3) In some implementations of A1 or A2, the video bitstream further includes a second syntax element indicating the number of model parameters used in the MH-CCP mode for at least the current coding block.

(A4) In some implementations of A3, the second syntax element is signaled as a high-level syntax element via one of a sequence header, a picture header, a subpicture header, a slice header, and a tile header.

(A5) In some implementations of A3, the second syntax element is signaled as a block-level syntax element on one of a largest coding block level, a coding block level, a prediction block level, a transform block level, and a predefined fixed block size level.

(A6) In some implementations of A1 or A2, the number of model parameters is not signaled for the current coding block, and determining the number of model parameters used in the MH-CCP mode for at least the current coding block further comprises: determining the number of model parameters based on coded information that is shared between an encoder and a decoder, the coded information including one or more of a frame resolution of the current image frame, a quantization parameter, a block size, a block shape, and a luma prediction mode of the current coding block.

(A7) In some implementations of any of A1-A6, the number of model parameters is selected from a plurality of predefined values, and generating the first chroma sample comprises: selecting one of the first luma sample and the one or more neighboring luma samples based on the number of model parameters, at least two of the plurality of predefined values corresponding to two distinct selected luma samples; and generating a non-linear term based on the selected one of the first luma sample and the one or more neighboring luma samples, wherein the first chroma sample is generated based on the non-linear term.

(A8) In some implementations of any of A1-A7, generating the first chroma sample comprises: in accordance with a determination that the number of model parameters is equal to a first value, generating a first non-linear term based on a first one of the first luma sample and the one or more neighboring luma samples; and in accordance with a determination that the number of model parameters is equal to a second value distinct from the first value, generating a second non-linear term based on a second distinct one of the first luma sample and the one or more neighboring luma samples.

(A9) In some implementations of any of A1-A8, wherein the number of model parameters corresponds to a plurality of hypothesis tap combinations, and identifying the one or more neighboring luma samples of the first luma sample further comprises: selecting one of the plurality of hypothesis tap combinations corresponding to the number of model parameters; and identifying the one or more neighboring luma samples of the first luma sample based on the one of the plurality of hypothesis tap combinations.

(A10) In some implementations of any of A1-A9, wherein the number of model parameters is equal to 2 and corresponds to a two-parameter model applied to reconstruct the first chroma sample of the current coding block in the MH-CCP mode, and the first chroma sample is generated based on a weighted combination of a non-linear term P and an offset term B.

(A11) In some implementations of A10, the method 900 further comprises determining the non-linear term P based on at least one of a set of eight neighboring luma sample of the first luma sample.

(A12) In some implementations of any of A1-A9, the number of model parameters is equal to 3 and corresponds to a three-parameter model applied to reconstruct the first chroma sample of the current coding block in the MH-CCP mode, and the first chroma sample is generated based on a weighted combination of a first number of linear terms, a second number of non-linear terms, and a third number of offset terms, wherein a sum of the first number, the second number, and the third number is 3. The first number, the second number, and the third number are integer numbers selected from ranges of [0, 3], [0, 3], and [0, 1], respectively.

(A13) In some implementations of any of A1-A9, the number of model parameters is equal to 3 and corresponds to a three-parameter model applied to reconstruct the first chroma sample of the current coding block based on a weight sum of the first luma sample, a non-linear term, and an offset term in the MH-CCP mode, and generating the first chroma sample further comprises: determining the non-linear term based on at least one of the first luma sample and eight neighboring luma samples of the first luma sample.

(A14) In some implementations of any of A1-A9, the number of model parameters is equal to 3 and corresponds to a three-parameter model applied to reconstruct the first chroma sample of the current coding block based on a weight sum of a first neighboring luma sample, a non-linear term, and an offset term in the MH-CCP mode, and generating the first chroma sample further comprises determining the non-linear term based on at least one of the first luma sample, the first neighboring luma sample, and a set of seven remaining neighboring luma samples of the first luma sample.

(A15) In some implementations of any of A1-A9, the number of model parameters is equal to 4 and corresponds to a four-parameter model applied to reconstruct the first chroma sample of the current coding block in the MH-CCP mode, and the first chroma sample is generated based on a weighted combination of a first number of linear terms, a second number of non-linear terms, and a third number of offset terms. A sum of the first number, the second number, and the third number is 3, and the first number, the second number, and the third number are integer numbers selected from ranges of [0, 4], [0, 4], and [0,1], respectively.

(A16) In some implementations of any of A1-A9, the number of model parameters is equal to 4 and corresponds to a four-parameter model applied to reconstruct the first chroma sample of the current coding block based on a weight sum of the first luma sample, one of the one or more neighboring luma samples, a non-linear term, and an offset term in the MH-CCP mode.

(A17) In some implementations of any of A1-A16, generating the first chroma sample further comprises generating an offset term based on an average of a subset of the one or more neighboring luma samples of the first luma sample, and the first chroma sample is generated based on the offset term.

(A18) In some implementations of any of A1-A17, the current coding block is included in a current superblock that has a largest coding block size in the current image frame. The method 900 further comprises: in accordance with a determination that the current coding block is located immediately adjacent to a top boundary of the current superblock, applying a first top reference area having a first number of rows and located immediately above the current coding block to determine a plurality of weighing factors for generating the first chroma sample; and in accordance with a determination that the current coding block is not located immediately adjacent to the top boundary of the current superblock, applying a second top reference area having a second number of rows and located immediately above the current coding block to determine the plurality of weighing factors for generating the first chroma sample, the first number greater than the second number.

(A19) In some implementations of any of A1-A17, the current coding block is included in a current superblock that has a largest coding block size in the current image frame, and the first luma sample and the one or more neighboring luma samples have a resolution distinct from that of the first chroma sample.

(A20) In some implementations of any of A1-A17, the current coding block is included in a current superblock that has a largest coding block size in the current image frame, and the current superblock further includes an alternative coding block distinct from the current coding block. The method 900 further comprises in accordance with a determination that the alternative coding block is located immediately adjacent to a top boundary of the current superblock, aborting the MH-CCP mode for the alternative coding block.

(A21) In some implementations of any of A1-A17, the method 900 further comprises identifying a reference area of the current coding block including a top reference region having a first number of rows and a left reference region having a second number of columns, wherein the first number is less than the second number; and determining a plurality of weighing factors based on a set of one or more reference samples in the reference area for generating the first chroma sample.

(A22) In some implementations of any of A1-A17, the method 900 further comprises identifying a reference area including a subset of a plurality of rows of samples that are immediately above the current coding block, wherein the plurality of rows of samples includes a number of rows, and the number of rows is selected from a predefined set of integer numbers.

(A23) A computing system, comprising: control circuitry; and memory storing one or more programs configured to be executed by the control circuitry, the one or more programs further comprising instructions for: receiving video data comprising a current coding block of a current image frame; encoding the current image frame in accordance with intra prediction; determining that a multi-hypothesis cross-component prediction (MH-CCP) mode is enabled to determine each chroma sample of the current coding block based on a respective luma sample collocated with the respective chroma sample and one or more neighboring luma samples corresponding to the respective luma sample, wherein the MH-CCP mode is associated with a number of model parameters for identifying one or more neighboring luma samples of a first luma sample; transmitting the encoded current image frame via a video bitstream; and signaling, via the video bitstream, a first syntax element to indicate that the MH-CCP mode is applied to reconstruct a first chroma sample collocated with the first luma sample based on at least the first luma sample and the one or more neighboring luma samples.

(A24) A non-transitory computer-readable storage medium storing one or more programs for execution by control circuitry of a computing system, the one or more programs comprising instructions for: obtaining a source video sequence including a current coding block of a current image frame; and performing a conversion between the source video sequence and a video bitstream, wherein the video bitstream comprises: the current coding block of the current image frame; and a first syntax element for a multi-hypothesis cross-component prediction (MH-CCP) mode indicating whether to reconstruct each chroma sample of the current coding block based on at least a respective luma sample collocated with the respective chroma sample and one or more neighboring luma samples corresponding to the respective luma sample; wherein the MH-CCP mode is associated with a number of model parameters for identifying one or more neighboring luma samples of a first luma sample, and applied to reconstruct a first chroma sample collocated with the first luma sample based on at least the first luma sample and the one or more neighboring luma samples.

(A25) A method for decoding video data, comprising: receiving a video bitstream including a current coding block of a current image frame, wherein the video bitstream includes a first syntax element for a multi-hypothesis cross-component prediction (MH-CCP) mode; based on the first syntax element in the video bitstream, determining that the MH-CCP mode is enabled to reconstruct each sample of a second color component of the current coding block based on at least a respective sample of a first color component collocated with the respective sample and one or more neighboring samples of the second color component corresponding to the respective sample of the first color component; determining a number of model parameters used in the MH-CCP mode for at least the current coding block; identifying one or more neighboring samples of a first sample of the first color component based on the number of model parameters; generating a first sample of the second color component that is collocated with the first sample of the first color component based on the first sample and the one or more neighboring samples of the first color component; and reconstructing the current coding block including the first sample of the second color component.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A25 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A25 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments.

However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:

receiving a video bitstream including a current coding block of a current image frame, wherein the video bitstream includes a first syntax element for a multi-hypothesis cross-component prediction (MH-CCP) mode;

based on the first syntax element in the video bitstream, determining that the MH-CCP mode is enabled to reconstruct each of a plurality of chroma samples of the current coding block using at least a respective luma sample collocated with the respective chroma sample and one or more neighboring luma samples corresponding to the respective luma sample;

determining a number of model parameters used in the MH-CCP mode for at least the current coding block, including determining one or more linear terms, one or more non-linear terms, and an offset term;

identifying one or more neighboring luma samples of a first luma sample based on the number of model parameters;

generating a first chroma sample that is collocated with the first luma sample based on the first luma sample and the one or more neighboring luma samples; and reconstructing the current coding block including the first chroma sample.

2. The method of claim 1, wherein the number of model parameters is selected from 3, 4, and 5, and corresponds to a three-parameter model, a four-parameter model, and a five-parameter model to be applied to reconstruct the first chroma sample of the current coding block in the MH-CCP mode.

3. The method of claim 1, wherein the video bitstream further includes a second syntax element indicating the number of model parameters used in the MH-CCP mode for at least the current coding block.

4. The method of claim 3, wherein the second syntax element is signaled as a high-level syntax element via one of a sequence header, a picture header, a subpicture header, a slice header, and a tile header.

5. The method of claim 3, wherein the second syntax element is signaled as a block-level syntax element on one of a largest coding block level, a coding block level, a prediction block level, a transform block level, and a predefined fixed block size level.

6. The method of claim 1, wherein the number of model parameters is not signaled for the current coding block, determining the number of model parameters used in the MH-CCP mode for at least the current coding block further comprises:

determining the number of model parameters based on coded information that is shared between an encoder and a decoder, the coded information including one or more of a frame resolution of the current image frame, a quantization parameter, a block size, a block shape, and a luma prediction mode of the current coding block.

7. The method of claim 1, wherein the number of model parameters is selected from a plurality of predefined values, and generating the first chroma sample comprises:

selecting one of the first luma sample and the one or more neighboring luma samples based on the number of model parameters, at least two of the plurality of predefined values corresponding to two distinct selected luma samples; and generating a non-linear term of the one or more non-linear terms based on the selected one of the first luma sample and the one or more neighboring luma samples, wherein the first chroma sample is generated based on the non-linear term.

8. The method of claim 1, wherein generating the first chroma sample comprises:

in accordance with a determination that the number of model parameters is equal to a first value, generating a first non-linear term based on a first one of the first luma sample and the one or more neighboring luma samples; and in accordance with a determination that the number of model parameters is equal to a second value distinct from the first value, generating a second non-linear term based on a second distinct one of the first luma sample and the one or more neighboring luma samples.

9. The method of claim 1, wherein the number of model parameters corresponds to a plurality of hypothesis tap combinations, and identifying the one or more neighboring luma samples of the first luma sample further comprises:

selecting one of the plurality of hypothesis tap combinations corresponding to the number of model parameters; and identifying the one or more neighboring luma samples of the first luma sample based on the one of the plurality of hypothesis tap combinations.

10. The method of claim 1, wherein the number of model parameters is equal to 2 and corresponds to a two-parameter model applied to reconstruct the first chroma sample of the current coding block in the MH-CCP mode, and the first chroma sample is generated based on a weighted combination of a non-linear term P of the one or more non-linear terms and the offset term.

11. The method of claim 10, further comprising:

determining the non-linear term P based on at least one of a set of eight neighboring luma sample of the first luma sample.

12. The method of claim 1, wherein the number of model parameters is equal to 3 and corresponds to a three-parameter model applied to reconstruct the first chroma sample of the current coding block in the MH-CCP mode, and the first chroma sample is generated based on a weighted combination of a first number of linear terms of the one or more linear terms, a second number of the one or more non-linear terms, and a third number of offset terms, including the offset term, wherein a sum of the first number, the second number, and wherein the third number is 3, and the first number, the second number, and the third number are integer numbers selected from ranges of [0, 3], [0, 3], and [0,1], respectively.

13. The method of claim 1, wherein the number of model parameters is equal to 3 and corresponds to a three-parameter model applied to reconstruct the first chroma sample of the current coding block based on a weight sum of the first luma sample, a non-linear term of the one or more non-linear terms, and the offset term in the MH-CCP mode, generating the first chroma sample further comprising:

determining the non-linear term based on at least one of the first luma sample and eight neighboring luma samples of the first luma sample.

14. The method of claim 1, wherein the number of model parameters is equal to 3 and corresponds to a three-parameter model applied to reconstruct the first chroma sample of the current coding block based on a weight sum of a first neighboring luma sample, a non-linear term of the one or more non-linear terms, and the offset term in the MH-CCP mode, generating the first chroma sample further comprising:

determining the non-linear term based on at least one of the first luma sample, the first neighboring luma sample, and a set of seven remaining neighboring luma samples of the first luma sample.

15. The method of claim 1, wherein the number of model parameters is equal to 4 and corresponds to a four-parameter model applied to reconstruct the first chroma sample of the current coding block in the MH-CCP mode, and the first chroma sample is generated based on a weighted combination of a first number of the one or more linear terms, a second number of the one or more non-linear terms, and a third number of offset terms, wherein a sum of the first number, the second number, and the third number is 3, and the first number, the second number, and the third number are integer numbers selected from ranges of [0, 4], [0, 4], and [0,1], respectively.

16. The method of claim 1, wherein the number of model parameters is equal to 4 and corresponds to a four-parameter model applied to reconstruct the first chroma sample of the current coding block based on a weight sum of the first luma sample, one of the one or more neighboring luma samples, a non-linear term of the one or more non-linear terms, and the offset term in the MH-CCP mode.

17. The method of claim 1, wherein generating the first chroma sample further comprising:

generating the offset term based on an average of a subset of the one or more neighboring luma samples of the first luma sample, wherein the first chroma sample is generated based on the offset term.

18. The method of claim 1, wherein the current coding block is included in a current superblock that has a largest coding block size in the current image frame, the method further comprising:

in accordance with a determination that the current coding block is located immediately adjacent to a top boundary of the current superblock, applying a first top reference area having a first number of rows and located immediately above the current coding block to determine a plurality of weighing factors for generating the first chroma sample; and in accordance with a determination that the current coding block is not located immediately adjacent to the top boundary of the current superblock, applying a second top reference area having a second number of rows and located immediately above the current coding block to determine the plurality of weighing factors for generating the first chroma sample, the first number greater than the second number.

19. The method of claim 1, wherein the current coding block is included in a current superblock that has a largest coding block size in the current image frame, and the first luma sample and the one or more neighboring luma samples have a resolution distinct from that of the first chroma sample.

20. The method of claim 1, wherein the current coding block is included in a current superblock that has a largest coding block size in the current image frame, and the current superblock further includes an alternative coding block distinct from the current coding block, the method further comprising:

in accordance with a determination that the alternative coding block is located immediately adjacent to a top boundary of the current superblock, aborting the MH-CCP mode for the alternative coding block.

21. The method of claim 1, further comprising:

identifying a reference area of the current coding block including a top reference region having a first number of rows and a left reference region having a second number of columns, wherein the first number is less than the second number; and determining a plurality of weighing factors based on a set of one or more reference samples in the reference area for generating the first chroma sample.

22. The method of claim 1, further comprising:

identifying a reference area including a subset of a plurality of rows of samples that are immediately above the current coding block, wherein the plurality of rows of samples includes a number of rows, and the number of rows is selected from a predefined set of integer numbers.

23. A method for encoding video data, comprising:

receiving video data including a current block of a current image frame;

determining that a multi-hypothesis cross-component prediction (MH-CCP) mode is to be used for each of a plurality of chroma samples of the current block using at least a respective luma sample collocated with the respective chroma sample and one or more neighboring luma samples corresponding to the respective luma sample;

determining a number of model parameters to be used in the MH-CCP mode for at least the current block, including determining one or more linear terms, one or more non-linear terms, and an offset term;

identifying one or more neighboring luma samples of a first luma sample based on the number of model parameters;

generating a first chroma sample that is collocated with the first luma sample based on the first luma sample and the one or more neighboring luma samples;

encoding the current coding block including the first chroma sample; and signaling, via a video bitstream, a first syntax element indicating the MH-CCP mode for the current block.

24. A method of storing a video bitstream, the video bitstream comprising:

a plurality of encoded blocks corresponding to video data, the plurality of encoded blocks including a current block; and a first syntax element indicating whether the current block is encoded using a multi-hypothesis cross-component prediction (MH-CCP) mode;

the method comprising:

determining that the MH-CCP mode is to be used for each of a plurality of chroma samples of the current block using at least a respective luma sample collocated with the respective chroma sample and one or more neighboring luma samples corresponding to the respective luma sample;

determining a number of model parameters to be used in the MH-CCP mode for at least the current block, including determining one or more linear terms, one or more non-linear terms, and an offset term;

identifying one or more neighboring luma samples of a first luma sample based on the number of model parameters;

generating a first chroma sample that is collocated with the first luma sample based on the first luma sample and the one or more neighboring luma samples; and encoding the current coding block including the first chroma sample.

* * * * *